US012380885B2

(12) United States Patent
Muppalla

(10) Patent No.: US 12,380,885 B2
(45) Date of Patent: Aug. 5, 2025

(54) BIT VECTOR-BASED CONTENT MATCHING FOR THIRD-PARTY DIGITAL ASSISTANT ACTIONS

(71) Applicant: Google LLC, Mountain View, CA (US)

(72) Inventor: Dharmadeep Muppalla, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 9 days.

(21) Appl. No.: 17/798,165

(22) PCT Filed: Jul. 19, 2021

(86) PCT No.: PCT/US2021/042231

§ 371 (c)(1),
(2) Date: Jan. 26, 2023

(87) PCT Pub. No.: WO2023/003537

PCT Pub. Date: Jan. 26, 2023

(65) Prior Publication Data

US 2024/0185847 A1 Jun. 6, 2024

(51) Int. Cl.
*G10L 15/22* (2006.01)
*G06F 16/3329* (2025.01)

(52) U.S. Cl.
CPC .......... *G10L 15/22* (2013.01); *G06F 16/3329* (2019.01)

(58) Field of Classification Search
None
See application file for complete search history.

(56) References Cited

U.S. PATENT DOCUMENTS

| | | | |
|---|---|---|---|
| 6,532,444 B1 | 3/2003 | Weber | |
| 10,311,372 B1 | 6/2019 | Hotchkies et al. | |
| 10,417,566 B2 * | 9/2019 | Sarikaya ................ | G06F 40/35 |
| 10,467,215 B2 | 11/2019 | Hopcroft et al. | |
| 11,194,866 B2 | 12/2021 | Wang et al. | |

(Continued)

FOREIGN PATENT DOCUMENTS

| | | |
|---|---|---|
| CN | 111816166 | 10/2020 |
| EP | 1110206 | 6/2001 |
| WO | WO 2019/212566 | 11/2009 |

OTHER PUBLICATIONS

International Preliminary Report on Patentability for Application No. PCT/US2021/042231, mailed Feb. 1, 2024, 14 pages.

(Continued)

*Primary Examiner* — Jonathan C Kim
(74) *Attorney, Agent, or Firm* — DORITY & MANNING, P.A.

(57) ABSTRACT

Matching content to third-party digital assistant actions using a bit vector is provided. A system receives an application with voice-assistant compatible actions. The system identifies the actions in the application. The system identifies content items provided by third-party computing devices. The system generates, via a machine learning model and performance data for the content items, bit vectors or the actions. The system selects, responsive to a request for content from a client device that executes an action of the application, a content item based on the bit vector that corresponds to the action.

20 Claims, 4 Drawing Sheets

200

Receive Application — 202

Identify Actions And Generate Transcript — 204

Receive Content Data — 206

Generate Bit Vectors — 208

(56) References Cited

U.S. PATENT DOCUMENTS

2006/0235699 A1* 10/2006 Dhanakshirur ......... G10L 15/22 704/E15.04
2007/0156407 A1* 7/2007 Schedl .................. H04M 3/493 704/E15.046
2015/0193405 A1* 7/2015 Gensburg ............ G06F 11/3692 715/229
2016/0134752 A1* 5/2016 Aldecoa .............. H04M 3/2236 379/88.01
2016/0189717 A1* 6/2016 Kannan ................... G10L 15/22 704/275
2017/0316777 A1* 11/2017 Perez ...................... G06F 40/35
2019/0303274 A1* 10/2019 Funnell ............... G06F 11/3409
2020/0286473 A1* 9/2020 Anders ................... G10L 15/19
2020/0349951 A1* 11/2020 Das ......................... G10L 15/28
2020/0388280 A1* 12/2020 Muppalla ................ G10L 15/22
2020/0409825 A1* 12/2020 Balasubramanian ........................ G06F 11/3409
2020/0410030 A1* 12/2020 Bai ..................... G06F 9/44521
2021/0064826 A1* 3/2021 Rajagopal ............... G06F 40/35
2021/0294724 A1* 9/2021 Muppalla ............ G06F 11/3692
2021/0335338 A1* 10/2021 Zhou ....................... G10L 15/01
2022/0043859 A1* 2/2022 Ganguly ............. G06F 16/9024
2024/0185847 A1* 6/2024 Muppalla ................ G10L 15/22

OTHER PUBLICATIONS

International Search Report and Written Opinion for Application No. PCT/US2021/042231, mailed Apr. 25, 2022, 18 pages.

Chinese Search Report Corresponding to Application No. 2021800177724 on Mar. 16, 2025.

Touazi et al., "A Case Study on Back-End Voice Activity Detection for Distributed Speech Recognition System using Support Vector Machines", Tenth International Conference on Signal-Image Technology & Internet-Based Systems, IEEE Computer Society, 2014, 6 pages.

* cited by examiner

BIT VECTOR-BASED CONTENT MATCHING FOR THIRD-PARTY DIGITAL ASSISTANT ACTIONS

PRIORITY CLAIM

This application is based upon and claims the right of priority under 35 U.S.C. § 371 to International Application No. PCT/US2021/042231 filed on Jul. 19, 2021, which is incorporated by reference herein.

BACKGROUND

A computing device can execute an application. The computing device can receive a query from a user, process the query, and provide a response to the query. However, due to limited availability or functionality in input or output interfaces of the computing device, it can be challenging to provide useful responses to a query with limited information in a manner that is efficient and without excessive input/output processes via the available interface.

SUMMARY

This disclosure is generally directed to bit vector-based content matching for digital assistant actions. In particular, an application executing on a computing device can be configured with voice-actions that can be invoked by a user. The data processing system of this technical solution can identify the invocation of a voice action in an application, retrieve a bit vector generated for the action in the application, and select a content item to provide responsive to or along with execution of the voice action.

For example, due to a large number of assistant actions developed by third-party developers of applications, and the various dialog states that these actions can enter during human interaction, it can be challenging to efficiently and accurately match content items (digital component objects or supplementary content items) to the third-party developed assistant actions. It can be challenging to efficiently and accurately match the content items because the action responses may not be revealed until a user starts conversing with an action, and there are many different paths that an action can take based on a user utterance. Further, it can be challenging to efficiently and accurately match the content items because of the difficulty in generating relevant signals from the action to match with content items.

Systems and methods of this technical solution provide bit vector-based content matching for digital assistant actions. For example, a data processing system of this technical solution can include an action crawler that can simulate conversation with the digital assistant-based application. The action crawler can crawl various conversation paths in the third-party action. The data processing system can obtain the output of the action crawler and feed the output into a machine learning model to extract an embedding. The data processing system can use this embedding to retrieve the nearest matching content items. The data processing system can score the content items against the action crawler output. The data processing system can create a bit vector for the action that includes the relevant content items. The data processing system can subsequently retrieve the bit vector to perform real-time content selection responsive to a request for content or invocation of the corresponding action.

At least one aspect is directed to a system comprising a data processing system having memory and one or more processors. The data processing system can receive an application from an application developer that is configured with voice assistant-compatible actions. The data processing system can identify actions the application is configured to perform responsive to voice input. The data processing system can identify content items provided by third-party of computing devices. The data processing system can generate, via a machine learning model and performance data for the content items, bit vectors corresponding to the actions. The bit vectors can indicate candidate content items for each action of the actions. The data processing system can select, responsive to a request for content for a computing device that executes an action of the application, a content item based on a bit vector of the bit vectors that corresponds to the action.

At least one aspect is directed to a method performed by a data processing system having memory and one or more processors. The method can include the data processing system receiving an application from an application developer that is configured with voice assistant-compatible actions. The method can include the data processing system identifying actions the application is configured to perform responsive to voice input. The method can include the data processing system identifying content items provided by third-party of computing devices. The method can include the data processing system generating, via a machine learning model and performance data for the content items, bit vectors corresponding to the actions. The bit vectors can indicate candidate content items for each action of the actions. The method can include the data processing system selecting, responsive to a request for content for a computing device that executes an action of the application, a content item based on a bit vector of the bit vectors that corresponds to the action.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
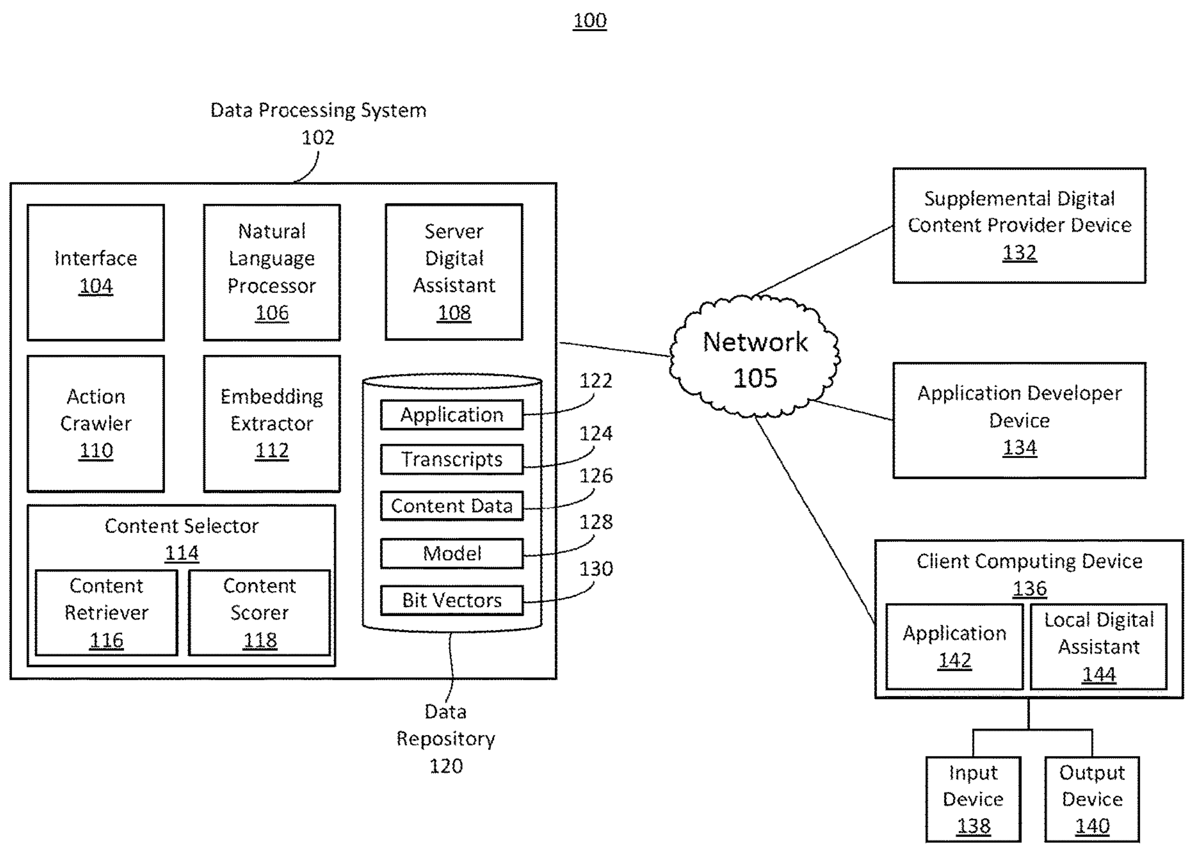
FIG. 1 is an illustration of an example system for vector-based content matching for third-party digital assistant actions, in accordance with implementations.

Following below are more detailed descriptions of various concepts related to, and implementations of, methods, apparatuses, and systems of vector-based content matching for third-party digital assistant actions. The various concepts introduced above and discussed in greater detail below may be implemented in any of numerous ways.

This technical solution is generally directed to bit vector-based content matching for third-party digital assistant actions. An application developer can develop an application for installation and execution on a computing device. The application can be referred to as a third-party application developer because they are an independent or separate entity from the provider, owner, or manufacturer of the computing device. The application developer can provide the application to a data processing system or cloud computing system or environment. For example, the application developer can provide the application to an online marketplace or application store. The computing device can download the application from the online application store or marketplace.

The application can include digital assistant actions. The application can include voice actions. The application can interface with a digital assistant executing on the computing device. The application can be configured with voice actions to provide a conversational user interface. For example, a user of the computing device can interface with the application via a conversational interface. A conversational interface can refer to or include having a voice-based dialogue with the application. During the dialog, the user can invoke one or more voice actions in the application.

In an illustrative example, the application can be for a theme park. The application can include references to various characters associated with the theme park, such as cartoon characters. The application can provide various content associated with the characters, such as multimedia content, videos, movies, shows, music, songs, stories, poems, or other content. The application can provide entertainment-related content responsive to invocation of a voice content.

However, when a voice-based action is invoked, it can be challenging to identify or select a supplementary content item provided by a supplementary content provider to provide alongside or with the execution of the voice-based action. For example, a content selector component may not be aware of the dialog path or conversational path that led to invocation of a particular voice action. The content selector may not be aware of the conversational branch that resulted in the utterance that invoked the voice action. This may be because a voice action is not like a web page in that the response to the voice action from the application can take into account one or more previous branches associated with the conversational or dialogue flow. The content selector may not have access to those previous branches or information associated with the previous branches. The content selector may have only minimal or inadequate information. The content selector may attempt to select a content item based on the voice action itself, because the content selector may not have access to the prior branches in the conversational flow. Thus, the content selector may select irrelevant content items, or may perform a resource intensive selection process to attempt to select a content item, but with low accuracy or low relevancy score. This can result in wasted resource consumption, or incorrect or inaccurate content item selection. Providing inaccurate or irrelevant content items can cause excessive remote procedure calls or network bandwidth utilization, as multiple additional content items may be selected and transmitted to the computing device via a network. Further, providing inaccurate or irrelevant content items to a computing device can cause poor user experience. The content item may perform poorly on the computing device in that the user may not interact or engage with the content item. In some cases, users may skip or forward through inaccurate content items, thereby causing the user to provide additional input or interaction with the computing device that compared to presentation of an accurate or relevant content item.

To address these and other technical challenges and problems, this technical solution can generate and use bit vectors to match content items to third-party voice actions invoked in third-party application executing on a computing device. To do so, a data processing system of this technical solution can receive an application from an application developer. The data processing system can crawl the application for actions. The data processing system can simulate a conversation with the application to identify various branches in conversation or dialog flow, and corresponding actions that can be invoked at each branch. The same voice action theme in an application can be invoked via multiple dialog flows in the application, which can result in different responses to the voice action. For example, a dialog flow can include "Talk to Character_A", which can branch into the following three branches: 1) play game, 2) read story, or 3) sing song. Each of these branches can correspond to a different voice action.

The data processing system can crawl the application to identify the various dialog flows and corresponding voice actions and generate a transcript. The transcript can include the voice actions and dialog flows that resulted in the voice action or can cause invocation voice action. The transcript can include web reference ("webref") entities, internal classification information, or vertical classifications. The data processing system can receive supplementary content items provided by supplementary content provider, such as an advertiser. The data processing system can input the transcript along with the content items into a deep learning model to generate a bit vector. The bit vector can be generated for each voice action. The bit vector can indicate, for each voice action, candidate content items that are deemed relevant to the voice action by the deep learning model. The deep learning model can include a multi-layer cross attention model. The training data can include performance of content items when presented with voice actions. Performance can include whether a user skipped a content item when it was presented with the particular voice action, or whether the user perceived, viewed or listened to the full content item when it was played for the duration. The bit vector can provide a concise representation of all the input into the deep learning model. The data processing system can match and score content items with respect to the voice action.

The data processing system can provide the bit vector to the content selector. Storing the bit vector can be more efficient than separately storing the transcript of dialogues for the voice action and separately storing the content items. For example, the bit vector may consume less memory or storage in a data repository of the data processing system. In another example, it may more efficient to perform a lookup in the bit vector to identify candidate content items for the voice actions during a real-time content selection process, as opposed to scoring a larger set of content items with respect to a transcript. The content selector can use the bit vector during content serving time to perform real-time content selection responsive to a request for content or responsive to invocation of a voice action.

In some cases, the data processing system can separately generate a content item bit vector for each group of content items in order to match the most relevant content items to a voice action. To do so, the data processing system can use k-dimensional trees or a combination of data structures.

Upon execution of the third-party application on a computing device, a user can invoke a voice-action in the application via a dialog flow or conversation. The data processing system can receive an indication of the voice action. The data processing system can perform a lookup with the voice action in a bit vector data repository to identify a corresponding set of candidate content items. The data processing system can retrieve the top ranking candidate content items from the bit vector. The data processing system can score the top ranking candidate content items using additional signals associated with the computing device, or electronic account thereof, in order to select the highest scoring content item. The data processing system can then provide the highest scoring content item to the computing device for presentation. By scoring the top ranking candidate content items, instead of all available content items, the data processing system can reduce computational resource utilization without sacrificing accuracy or relevancy of the selecting content item.

Upon presenting the content item, the data processing system can receive performance information. Performance information can include, for example, whether the user skipped the content item, how long the user listened to the content item, or whether the user listened to the full duration of the content item. For example, if the content item included audio output for 15 seconds, and the user skipped the audio output after 3 seconds, the data processing system can determine the content item performed poorly. If the user listened to the full 15 second duration of the content item, then the data processing system can determine that the content item performed well for the voice action. The data processing system can update the deep learning model used to generate the bit vector based on the performance of the content item. The data processing system can determine to re-train or otherwise update the model. The data processing system can determine to re-generate or update the bit vector based on the received performance feedback.

FIG. 1 illustrates an example system 100 for vector-based content matching for third-party digital assistant actions, in accordance with implementations. The system 100 can include content selection infrastructure. The system 100 can include a data processing system 102. The data processing system 102 can communicate with one or more of a client computing device 136, or a supplementary digital content provider device 132 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be provided, output, rendered, or displayed on the client computing device 136.

The network 105 can include or constitute a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be provided, output, rendered, or displayed by the client computing device 136. For example, via the network 105 a user of the client computing device 136 can access information or data provided by the supplementary digital content provider device 132.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 136 can include, for example, a laptop, desktop, tablet, digital assistant device, smart phone, mobile telecommunication device, portable computers, smart watch, wearable device, headset, speaker, television, smart display, or automotive unit. For example, via the network 105 a user of the client computing device 136 can access information or data provided by a supplementary digital content provider device 132. In some cases, the client computing device 136 may or may not include a display: for example, the computing device may include limited types of user interfaces, such as a microphone and speaker. In some cases, the primary user interface of the client computing device 136 may be a microphone and speaker, or voice interface. In some cases, the client computing device 136 includes a display device coupled to the client computing device 136, and the primary user interface of the client computing device 136 can leverage the display device.

The client computing device 136 can include at least one input device 138. The input device 138 can include at least one microphone. The input device 138 can include a transducer or other hardware configured to detect sound waves, such as voice input from a user, and convert the sound waves into another format that can be processed by the client computing device 136. For example, the input device 138 can detect sound waves, and convert the sound waves to analog or digital signals. The client computing device 136, using hardware or software, can convert the analog or digital signals to data packets that correspond to the voice input or other detected audio input. The client computing device 136 can transmit data packets with the voice input to the data processing system 102 for further processing. The input device 138 can include a touch input device, keyboard, mouse, gesture input, sensor input, or other type of input interface.

The client computing device 136 can include at least one output device 140. The output device 140 can include a speaker. The output device 140 can output audio or sound.

The output device 140 can be driven by an audio driver to generate an audio output. The output device 140 can output speech or other audio generated by the data processing system 102 and provided to the client computing device 136 for output. For example, the user can conduct a conversation with a digital assistant 108 via the input device 138 and output device 140 of the client computing device 136.

In some cases, the client computing device 136 can include one or more component or functionality of the data processing system 102, such as the NLP 106, digital assistant 108, interface 104, or data repository 120. For example, the client computing device 136 can include a local digital assistant 144 or digital assistant agent having one or more component or functionality of the server digital assistant 108 or NLP 106. The client computing device 136 can include a data repository, memory or storage device that stores one or more of an application, content data, account information, or profile information. The client computing device 136 can include one or more component or functionality of computing system 400 depicted in FIG. 4.

The system 100 can include at least one data processing system 102. The data processing system 102 can include at least one logic device such as a computing device having a processor to communicate via the network 105, for example with the client computing device 136, the supplementary digital content provider device 132 (or third-party content provider device, content provider device), or an application developer device 134. The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one third-party device, such as a supplementary digital content provider device 132, a service provider device, or an application developer device 134. The supplemental digital content provider device 132, service provider device, or application developer device 134 can include at least one logic device such as a computing device having a processor to communicate via the network 105, for example with the client computing device 136, or the data processing system 102.

The supplementary digital content provider device 132 can provide content items to the data processing system 102 for the data processing system 102 to provide to the client computing device 136 for presentation. The content items can include visual content, audio content, text-based content, multimedia content, or other types of content. The content items can include audio based digital components for presentation by the client computing device 136 as an audio output digital component. The digital component can be referred to as a sponsored digital component because it is provided by a third-party sponsor, such as an advertisement provided by an advertiser. The digital component can include an offer for a good or service, such as a voice based message that states: "Would you like me to order you a taxi?" For example, the supplementary digital content provider device 132 can include memory to store a series of audio digital components that can be provided in response to a voice based query. The supplementary digital content provider device 132 can also provide audio based digital components (or other digital components) to the data processing system 102 where they can be stored in a data repository of the data processing system 102. The data processing system 102 can select the audio digital components and provide (or instruct the supplementary digital content provider device 132 to provide) the audio digital components to the client computing device 136. The audio based digital components can be exclusively audio or can be combined with text, image, or video data. The content item can have a duration, such as the length of the audio or video. The content item, when presented via the client computing device 136, can be presented with user interface elements that allow for interaction or engagement with the content item. For example, the user interface element can allow for input or commands that cause the client computing device 136 to pause presentation or playback of the content item, skip play back of the content item, fast forward the content item, rewind the content item, close or hide the content item, engage with the content item, or otherwise interact with the content item. The type of interaction can indicate a performance associated with the content item. For example, rewinding or re-playing the content item can indicate positive performance, whereas skipping the content item or fast forwarding the content item can indicate negative performance.

The data processing system 102 can include a content placement system having at least one computation resource or server. The data processing system 102 can include, interface, or otherwise communicate with at least one interface 104. The data processing system 102 can include, interface, or otherwise communicate with at least one natural language processor 106 (or natural language processor component). The interface 104 or natural language processor 106 can form or be referred to as a server digital assistant 108. The data processing system 102 can include, interface, or otherwise communicate with at least one server digital assistant 108 (or server digital assistant component). The server digital assistant 108 can communicate or interface with one or more voice-based interfaces or various digital assistant devices or surfaces in order to provide data or receive data or perform other functionality. The data processing system 102 can include at least one action crawler 110 (or action crawler component). The data processing system 102 can include at least one embedding extractor 112 (or embedding extractor component). The data processing system 102 can include at least one content selector 114 (or content selector component). The content selector 114 can include at least one content retriever 116 (or content retriever component). The content selector 114 can include at least one content scorer 118 (or content scorer component). The data processing system 102 can include at least one data repository 120. The data repository 120 can store applications 122. An application 122 can include information about an application, metadata for an application, or an executable or source code for the application, or an application package file provided by the application developer device 134. The data repository 120 can store transcripts 124 for voice actions and dialogues associated with an application 122, and generated by the action crawler 110. The data repository 120 can store content data 126, such as content items, content item performance, information about content item, content item metadata or other information about content items provided by a supplemental digital content provider device 132, or generated by the content selector 114. The data repository 120 can include a model 128, such as a deep learning model or other machine learning model generated or used by the embedding extractor 112 to generate bit vectors. The data repository 120 can include bit vectors 130 generated by the embedding extractor 112 for voice actions of applications.

The data processing system 102, interface 104, NLP 106, server digital assistant component 108, action crawler 110, embedding extractor 112, content selector 114, content retriever 116, and content scorer 118 can each include at least one processing unit or other logic device such as programmable logic array engine, or module configured to communicate with a data repository or database of the data processing system 102. The interface 104, NLP 106, server digital assistant component 108, action crawler 110, embedding extractor 112, content selector 114, content retriever 116, and content scorer 118 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 136 (or computing device or digital assistant device). A user of a client computing device 136 or mobile computing device can affirmatively authorize the data processing system 102 to obtain network activity information corresponding to the client computing device 136 or mobile computing device. For example, the data processing system 102 can prompt the user of the client computing device 136 for consent to obtain one or more types of network activity information. The identity of the user of the client computing device 136 can remain anonymous and the client computing device 136 can be associated with a unique identifier (e.g., a unique identifier for the user or the computing device provided by the data processing system or a user of the computing device). The data processing system 102 can associate each observation with a corresponding unique identifier.

The data processing system 102 can include an interface 104 (or interface component) designed, configured, constructed, or operational to receive and transmit information using, for example, data packets. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can communicate with one or more of the client computing device 136, supplementary digital content provider device 132, or application developer device 134 via network 105.

The data processing system 102 can interface with an application, script or program installed at the client computing device 136, such as an application 142 or local digital assistant 144 to communicate input audio signals to the interface 104 of the data processing system 102 and to drive components of the client computing device 136 to render, present or otherwise output visual or audio signals. The data processing system 102 can receive, from the application 142 or local digital assistant 144, data packets or other signal that includes or identifies an audio input signal.

The data processing system 102 can include a natural language processor ("NLP") 106. For example, the data processing system 102 can execute or run the NLP 106 to parse received input audio signals or queries. For example, the NLP 106 can provide for interactions between a human and a computer. The NLP 106 can be configured with techniques for understanding natural language and allowing the data processing system 102 to derive meaning from human or natural language input. The NLP 106 can include or be configured with technique based on machine learning, such as statistical machine learning. The NLP 106 can utilize decision trees, statistical models, or probabilistic models to parse the input audio signal. The NLP 106 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP 106 can convert the audio input signal into recognized text by comparing the input signal against a stored, representative set of audio waveforms and choosing the closest matches. The set of audio waveforms can be stored in a data repository or other database accessible to the data processing system 102. The representative waveforms are generated across a large set of users, and then may be augmented with speech samples from the user. After the audio signal is converted into recognized text, the NLP 106 matches the text to words that are associated, for example via training across users or through manual specification, with actions that the data processing system 102 can serve. Aspects or functionality of the NLP 106 can be performed by the data processing system 102 or the client computing device 136. For example, an NLP component can execute on the client computing device 136 to perform aspects of converting the input audio signal to text and transmitting the text via data packets to the data processing system 102 for further natural language processing.

The audio input signal can be detected by an input device 138 of the client computing device 136 (e.g., a microphone, sensor, transducer). Via the transducer, the audio driver, or other components, the client computing device 136 can provide the audio input signal to the data processing system 102 (e.g., via the network 105) where it can be received (e.g., by the interface 104) and provided to the NLP 106 or stored in a data repository.

The data processing system 102 can receive, via the interface 104, data packets comprising an input audio signal detected by a microphone of the client computing device 136. The data processing system 102 can receive data packets that are generated based on an input audio signal detected by the microphone. The data packets can be filtered or unfiltered. The data packets can be a digitized version of the detected input audio signal. The data packets can include text that is generated by the client computing device 136 based on the detected input audio signal. For example, a local digital assistant of the client computing device 136 can process a detected input audio signal and transmit data packets based on the processed input audio signal to the server digital assistant 108 for further processing or to perform an action.

The data processing system 102 can include a server digital assistant 108. The server digital assistant 108 and the NLP 106 can be a single component, or the server digital assistant 108 can include one or more component or functionality of the NLP 106. The server digital assistant 108 can interface with the NLP 106. The data processing system 102 (e.g., server digital assistant 108) can process the data packets to perform an action or otherwise respond to the voice input. In some cases, the data processing system 102 can identify an acoustic signature from the input audio signal. The data processing system 102 can identify, based on a lookup in a data repository (e.g., querying a database), an electronic account corresponding to the acoustic signature. The data processing system 102 can establish, responsive to identification of the electronic account, a session and an account for use in the session. The account can include a profile having one or more policies. The data processing system 102 can parse the input audio signal to identify a request and a trigger keyword corresponding to the request.

The NLP 106 can obtain the input audio signal. The NLP 106 of the data processing system 102 can receive the data packets with the voice input or input audio signal responsive to a local digital assistant on the client computing device 136 detecting a trigger keyword. The trigger keyword can be a wakeup signal or hotword that indicates to the client computing device 136 to convert the subsequent audio input into text and transmit the text to data processing system 102 for further processing.

Upon receiving the input audio signal, the NLP 106 can identify at least one query or request or at least one keyword corresponding to the request. The request can indicate intent or subject matter of the input audio signal. The keyword can indicate a type of action likely to be taken. For example, the NLP 106 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request. In another example, the voice input can include a query or request to perform an action in an application.

The NLP 106 can parse the input audio signal to identify, determine, retrieve, or otherwise obtain the request and one or more keywords associated with the request. For instance, the NLP 106 can apply a semantic processing technique to the input audio signal to identify the keyword or the request. The NLP 106 can apply the semantic processing technique to the input audio signal to identify a keyword or phrase that includes one or more keywords, such as a first keyword and a second keyword. For example, the input audio signal can include the sentence "I want to purchase an audiobook." The NLP 106 can apply a semantic processing technique, or other natural language processing technique, to the data packets comprising the sentence to identify keywords or phrases "want to purchase" and "audiobook". The NLP 106 can further identify multiple keywords, such as purchase, and audiobook. For example, the NLP 106 can determine that the phrase includes a first and second keyword.

The NLP 106 can filter the input audio signal to identify the trigger keyword. For example, the data packets carrying the input audio signal can include "It would be great if I could get someone that could help me go to the airport", in which case the NLP 106 can filter out one or more terms as follows: "it", "would", "be", "great", "if", "I", "could", "get", "someone", "that", "could", or "help". By filtering out these terms, the NLP 106 may more accurately and reliably identify the trigger keywords, such as "go to the airport" and determine that this is a request for a taxi or a ride sharing service.

The server digital assistant 108 or local digital assistant 144 can interface with an application 142 executing on the client computing device 136. The application 142 can include voice-based actions or a voice interface. The application can receive voice input from a user of the client computing device 136. The client computing device 136 can forward the voice input to the data processing system 102 (e.g., the NLP 106 or server digital assistant 108) for further processing. In some cases, the application 142 can forward the voice actions to an application developer device 134 for processing. The application 142 can forward the voice action to the data processing system 102, which can pre-process the voice action and then forward the voice action to the application developer device 134. In some cases, the application 142, executing on the client computing device 136, can be configured to process the voice action and perform the corresponding action. In some cases, the application 142 forwards the voice input to the data processing system 102 for processing, and the data processing system 102 can identify an action or intent associated with the voice input, and forward a command to the application 142 to perform the requested action or intent.

The data processing system 102 can determine to select supplementary content items the voice-actions of the application 142. However, when a voice-based action is invoked, it can be challenging to identify or select a supplementary content item provided by a supplementary content provider to provide alongside or with the execution of the voice-based action. For example, a content selector 114 may not be aware of the dialog path or conversational path that led to invocation of a particular voice action. The content selector 114 may not be aware of the conversational branch that resulted in the utterance that invoked the voice action. This may be because a voice action is not like a web page in that the response to the voice action from the application can take into account one or more previous branches associated with the conversational or dialogue flow. The content selector may not have access to those previous branches or information associated with the previous branches. The content selector may have only minimal or inadequate information. The content selector may attempt to select a content item based on the voice action itself, because the content selector may not have access to the prior branches in the conversational flow. Thus, the content selector may select irrelevant content items, or may perform a resource intensive selection process to attempt to select a content item, but with low accuracy or low relevancy score. This can result in wasted resource consumption, or incorrect or inaccurate content item selection. Providing inaccurate or irrelevant content items can cause excessive remote procedure calls or network bandwidth utilization, as multiple additional content items may be selected and transmitted to the computing device via a network. Further, providing inaccurate or irrelevant content items to a computing device can cause poor user experience. The content item may perform poorly on the computing device in that the user may not interact or engage with the content item. In some cases, users may skip or forward through inaccurate content items, thereby causing the user to provide additional input or interaction with the computing device that compared to presentation of an accurate or relevant content item.

To address this these and other technical challenges, the data processing system 102 of this technical solution can include an action crawler 110 designed, constructed and operational to generate a transcript of actions that can be performed by the application. The action crawler 110 can receive an application from an application developer 134 that is configured with voice assistant-compatible actions. The action crawler 110 can identify actions the application is configured to perform responsive to voice input. The action crawler 110 can crawl the application to identify the actions. The action crawler 110 can simulate a conversation with the application to identify the various dialogue paths that a user can take with an application. The different dialogue paths can result in the performance of the same voice action or different voice actions, depending on the intents associated with the dialogue path.

For example, the NLP 106 or server digital assistant 108 of the data processing system 102 can simulate conversations with the application to identify the plurality of actions. The server digital assistant 108 can simulate one or more conversations with the application. In some cases, the data processing system 102 can receive an application package file from the application developer device 134 that includes example dialogues or transcript information. In some cases, the data processing system 102 can automatically determine the possible conversations that the application can engage in, and identify voice actions the application is configured to perform.

For example, the application can be related to providing entertainment content related to cartoon characters at a theme park. The action crawler 110 can simulate a dialogue with the application. The action crawler 110 can launch or invoke the application. The application can begin with a query or prompt, such as "which Character would you like to talk to?". The action crawler 110 can select a character from list of options by generating a simulated voice input that includes the statement "talk to Character_A". The application can respond to the action crawler 110 with a response and a prompt or query, such as "do you want to play a game with Character_A, read a story with Character_A, or sing a song with Character_A"? The action crawler 110 can select one of these voice actions, which corresponds to a voice-assistant enabled actions. The action crawler 110 can store a transcript for each of the voice actions that includes the dialogue flow that resulted in the invocation or selection of the voice action. The action crawler 110 can repeat this flow for each character in the application.

In another example, the action crawler 110 can invoke the application and then input a prompt or query that asks the application what tasks the application can perform. The action crawler 110 can then select a task and initiate one or more dialogue flows that result in invocation of a voice action. Thus, the action crawler 110 can crawl the application to generate a transcript comprising the actions the application is configured to perform pursuant to one or more dialogues. The data processing system 102 can generate the transcript to store information about the actions and the one or more dialogues used to invoke the action. The information can include the dialogue, keywords, webref entities, vertical classification, the intent, the voice action, or other information that facilitates content selection. A webref entity can correspond to entities that are classified in a taxonomy. Web reference entities assist in the understanding of text and augment a repository of knowledge. An entity may be a single person, place or thing, and the repository can include millions of entities that each have a unique identifier to distinguish among multiple entities with similar names (e.g., a Jaguar car versus a jaguar animal). The data processing system can access a reference entity and scan arbitrary pieces of text (e.g., text in web pages, text of keywords, text of content, text of advertisements) to identify entities from various sources. One such source, for example, may be a manually created taxonomy of entities such as an entity graph of people, places and things, built by a community of users.

The data processing system 102 can receive content items from a supplemental digital content provider device 132. The data processing system 102 can identify content items provided by third-party of computing devices, such as the supplemental digital content provider device 132. For example, a content selector 114 of the data processing system 102 can receive content items from a supplemental content provider device 132 via network 105. The data processing system 102 can receive the content items (or sponsored content items) via an interface of the data processing system, such as a graphical user interface. The data processing system 102 can associate the content items with an account identifier associated with the supplemental content provider device 132. The content items can be part of a content placement campaign. The content items can be part of a content group. The content items can be associated with content selection criteria, such as keywords, location, or other signals used to perform content selection in real-time by a content selector 114. The data processing system 102 can identify concepts, topics, entities, or verticals associated with the content items or content groups. The data processing system 102 can further identify or generate performance data for the content items. Performance data can include or indicate how well the content item performed when it was presented or provided for presentation on one or more client computing devices 136. Performance can refer to, include or be based on a level of interaction or type of interaction with the content item by a user of the client computing device 136. For example, performance information can include or be based on selecting the content item, clicking on the content item, a conversion, or completing a prompt or survey associated with the content item. Performance information can include, for example, whether a user closed the window in which the content item was presented, skipped play back of the content item, fast forwarded playback of the content item, repeated play back of the content item, or allowed the content item to play the full duration of the content item. Thus, the performance data for the content items can indicate a type of interaction with each of the content items responsive to a prior presentation of each of the content items via one or more computing devices 136. The type of interaction can include at least one of a skip, a fast forward, or a duration of presentation. The performance data can be stored in the content data 126 data structure in data repository 120.

The performance data can be associated or correlated with keywords or other signals associated with the content item, or signals associated with where the content item was presented. Signals can include a type of client computing device 136, location of the client computing device 136 when the content item was presented, information associated with a main content being presented on the client computing device 136 alongside or with the content item, or other account information or profile information associated with the client computing device 136.

However, due to the large number of content items received from the large number of supplemental digital content provider devices 132, as well as the large number of voice-based assistant actions and large number of applications, it can be challenging to perform real-time content selection of content items in an efficient and accurate manner. The data processing system 102 of this technical solution can include an embedding extractor 112 designed, constructed and operational to generate a bit vector that indicates, for each voice action, relevant candidate content items. The bit vector can be used by the content selector 114 to perform real-time content selection responsive to invocation of a voice action in an application executing a client computing device 136.

The embedding extractor 112 can generate, via a machine learning model and performance data for the content items, bit vectors corresponding to the actions. A bit vector can indicate candidate content items for an action. The embedding extractor 112 can take, as input, the transcript generated by the action crawler 110 along with the content item information or performance data and generate a bit vector that indicates which content items are relevant to each action in the transcript. For example, the transcript can include multiple voice-based actions in a particular application. Each action in the transcript can be associated with a dialogue flow that includes keywords, intents, concepts, topics or other information that is associated with the simulated conversation that led to the voice action. The embedding extractor 112 can, using the deep learning model 128, identify which content items are relevant to each action in the transcript. The embedding extractor 112 can generate one or more bit vectors for the application that identifies multiple candidate content items for each action in the transcript generated by the action crawler 110 for the application.

A bit vector can refer to or include a data structure that can be handled efficiently by the data processing system 102 or one or more processors and memory thereof. The bit vector can effectively allow the data processing system 102 to perform bit-level parallelism in hardware to perform operations quickly. The bit vector can be an array of bits. The bit vector can include multiple bits. The bit vector can include a mapping to values 0, 1, such as indicating for a particular action which content items are relevant. For example, a bit vector for a voice action "read a book with Character_A" can include an indication of which candidate content items from a set of candidate content items are relevant by indicating a 1 or 0 at a place in the bit vector, where the place in the bit vector corresponds to a particular candidate content item. Table 1 illustrates example bit vectors for different actions in an application and data structure listing candidate content items.

TABLE 1

Illustrative Example of Bit Vector for Voice Actions

| Candidate Content Items | Bit Vector for Action 1 | Bit Vector for Action 2 | Bit Vector for Action 3 |
|---|---|---|---|
| Content_item_1 | 0 | 0 | 1 |
| Content_item_2 | 0 | 1 | 1 |
| Content_item_3 | 1 | 0 | 0 |
| Content_item_4 | 1 | 1 | 0 |
| Content_item_5 | 1 | 0 | 1 |

In the illustrative example of Table 1, the candidate content item data structure for a particular application can list 5 different content items in an ordered list. The order can be based on any order, such as numerical order alphabetical order, or order of relevancy for the application. The embedding extractor 112 can generate a bit vector for each action in the transcript generated by the action crawler 110. For example, for Action 1, the bit vector can be [0 0 1 1 1]: for Action 2, the bit vector can be [0 1 0 1 0], and for Action 3, the bit vector can be [1 1 0 0 1]. The bit vector can indicate which of the content items are relevant or candidate for the particular voice action. For example, for voice action 1, the relevant candidate content items can be content items 3, 4 and 5. For voice action 2, the candidate content items can be 2 and 4. For voice action 3, the candidate content items can be 1, 2 and 5.

The different voice action illustrated in Table 1 may refer to different actions, such as play a song, read a book, or play music with character A. In another example, the different actions can refer to the same type of action, such as play a song, but with different characters as follows: voice action 1 can be play a song with Character_A: voice action 2 can be play a song with Character_B: and voice action 3 can be play a song with Character_C. The action crawler 110, by simulating conversations with the application to generate the transcript file, can generate, for the same type of action (e.g., play a song) different voice action identifiers based on the dialogue flow that resulted in invocation of the application. Thus, the table 1 can include different bit vectors for each action based on the dialogue flow that resulted in invocation of the voice action, thereby resulting in increased accuracy of content selection, while maintaining efficiency by using a bit vector format.

To generate the bit vector for each action, the data processing system 102 can train a deep learning model or machine learning model using training data. The training data can include historical data associated with prior presentations of content items on numerous client computing devices 136. The historical training data can be based on the performance of the content items and signals associated with the performance. The historical training data can include information about the content items (e.g., keywords, topics, entities), signals associated with presentation of the content item (e.g., type of computing device, location of the computing device, concepts, keywords or topics associated with main content with which the sponsored content is being presented, or profile information), performance data (e.g., whether the user interacted with the content item or skipped the content item).

The data processing system 102 can train the model 128 with the training data using a machine learning technique, such as a deep learning technique. A deep learning technique can refer to a deep structured learning. The deep learning technique can include or be based on an artificial neural network with representation learning. The deep learning technique can be supervised, semi-supervised, or unsupervised. The deep learning technique can include recurrent neural networks, convolution neural networks, deep neural networks, or deep reinforcement learning. The deep learning technique can use multiple layers to progressively extract high-level features from the input. For example, using the content data (e.g., content item information and performance data) and the transcript (e.g., voice action and information associated with the dialogue that resulted in invocation of the voice action), the deep learning technique can determine which content items are relevant or are predicted to perform favorably when presented alongside, proximate to in space or time, or otherwise with or for a particular voice action. The embedding extractor 112, using the deep learning model, can predict which content items are likely to perform well (e.g., have a likelihood of interaction above a threshold, such as 1%, 2%, 3%, 5%, 10%, 15%, 20% or more relative to the number of presentations of the content item). The embedding extractor 112 can predict, using the deep learning model, which content items are the highest performing content relative to the set of available content items received from one or more supplemental digital content provider devices 132. Thus, the embedding extractor 112 can take, as input, the transcript and the content item performance data and output a bit vector for each action in the transcript. The outputted bit vector can indicate, for the particular action, candidate content items that are candidates for presentation responsive to invocation of the action in the application 142 by the client computing device 136.

The data processing system 102 can include a content selector 114 designed, constructed, or operational to select supplementary content items (or sponsored content items or digital component objects). The content selector 114 can select, responsive to a request for content for a computing device 136 that executes an action of the application 142, a content item based on a bit vector that corresponds to the action. To avoid excessive computing resource utilization resulting from selecting from a large number of available content items, the content selector 114 can include a content retriever 116 designed, constructed and operational to retrieve candidate content items for the action invoked in the application using the bit vector generated by the embedding extractor 112. The bit vector can store an indication of a subset of all the available content items provided by various supplemental digital content provider devices 132 content items. The subset of all the available content items can be those content items that corresponding to highest ranking content items or the content items that are most relevant to the action of the application. The most relevant content items can be determined by the embedding extractor 112 using the deep learning model 128. This subset of content items can be listed or otherwise identified in the bit vector as candidates for presentation responsive to invocation of the action in the application 142. However, the content selector 114 can further refine the subset of content items to select a highest scoring content item of the subset of content items based on signals or other information associated with the particular client computing device 136 that invokes the action in the application 142.

The content retriever 116 can identify the action and the application 142 in which the action was invoked. For example, the application can be associated with a unique identifier, such as a name, alphanumeric identifier, or other unique identifier of the application. The content retriever 116 can further identify the action that was invoked in the application 142. The action can be associated with a unique identifier or an identifier that is unique to the application 142, such as a name, alphanumeric identifier, or other effective identifier.

The content retriever 116 can perform a lookup in the bit vectors 130 data structure using the identifier of the application and the identifier of the action to access, retrieve, obtain or otherwise identify the bit vector established for the action of the application. The content retriever 116 can identify one or more candidate content items that are indicated in the bit vector for the action. The content retriever 116 can identify unique identifiers for the content item, a uniform resource locator for the content item, a pointer to the content item, or other indicator of the content item that can be used to retrieve or provide the content item to the computing device 136.

The bit vector can indicate multiple candidate content items for a particular action invoked in the application 142. The candidate content items associated with the bit vector for the action can include content data 126, such as content selection criteria, performance data or other information that can facilitate content selection. The content retriever 116 can provide the candidate content items indicated in the bit vector to a content scorer 118 to select a content item from the candidate content items to provide to the computing device 136.

The content selector 114 can include a content scorer 118 designed, constructed and operational to select a content item from the candidate content items indicated in the bit vector. The content selector 114 can score the candidate content items to identify a highest scoring or highest ranking content item. The content selector 114 can score the candidate content items using any content scoring technique that can facilitate identifying the content item that is the most likely to perform well on the computing device 136. The content scorer 118 can use signals associated with the particular client computing device 136 that invoked the action to score the candidate content items. Signals can include, for example, a type of the computing device, geographic location of the computing device, language used with the client computing device (e.g., English, French, or Spanish), or profile information associated with an electronic account linked to the client computing device 136. For example, the content scorer 118 can predict which of the candidate content items is most likely to be relevant to the action invoked in the application 142 based on the signals associated with the client computing device 136. The content scorer 118 can predict which of the candidate content items is most likely to result in a favorable interaction by the user of the computing device 136. The content scorer 118 can predict which of the candidate content items is most likely to be played for the full duration of the content item without being skipped or closed by the user of the computing device 136.

To select sponsored content item or digital components, the content scorer 118 can use content selection criteria to select a matching sponsored content item based on a broad match, exact match, or phrase match. For example, the content selector 114 can analyze, parse, or otherwise process subject matter of candidate sponsored content items to determine whether the subject matter of the candidate sponsored content items correspond to the subject matter of the intent, keywords or phrases associated with the action invoked in the application 142. The content scorer 118 can identify, analyze, or recognize voice, audio, terms, characters, text, symbols, or images of the candidate digital components using an image processing technique, character recognition technique, natural language processing technique, or database lookup. The candidate sponsored content items can include metadata indicative of the subject matter of the candidate digital components, in which case the content scorer 118 may process the metadata to determine whether the subject matter of the candidate digital component corresponds to the action invoked in the application 142. The content campaign provided by the supplementary digital content provider device 132 can include content selection criteria that the content scorer 118 can match to criteria indicated in the second profile layer or the first profile layer.

The content selector 114 can, responsive to a request, perform a real-time content selection process. Real-time content selection can refer to or include performing the content selection responsive to a request. Real-time can refer to or include selecting the content within 0.2 seconds, 0.3 seconds, 0.4 seconds, 0.5, 0.6 seconds, or 1 second of receiving the request. Real-time can refer to selecting the content responsive to receiving the input audio signal from client computing device 136. The real-time content selection process can be expedited by identifying the bit vector for the action invoked in the application 142, and inputting the candidate content items identified in the bit vector into the content scorer 118 to output a highest ranking or scoring content item. The content scorer 118 can determine a score or rank for each of the multiple candidate supplementary content items in order to select a highest ranking supplementary content item to provide to the client computing device 136.

In some cases, the content scorer 118 can be configured with a machine learning model that can determine the highest scoring or most relevant content item. The machine learning model can be trained based on historical performance of content items associated with various signals. The model can output a prediction or score that indicates the likelihood of a content item performing well in the present of certain signals. Thus, the content selector 114 can use a machine learning technique to score or select a content item from the candidate content items retrieved by the content retriever 116.

Thus, the data processing system can receive an indication from the computing device 136 of invocation of the action. The data processing system 102 can perform a lookup with the action in a data repository 120 storing the bit vectors 130 to retrieve the bit vector corresponding to the action. The data processing system 102 can identify, from the bit vector for the action, top ranking candidate content items. The top ranking candidate content items can be identified by the embedding extractor 112 using the deep learning model 128, and stored in the bit vector for the action of the application. The data processing system 102 can select the highest scoring content item from the top ranking candidate content items identified from the bit vector for the action. The data processing system 102 can use one or more signals associated with the computing device 136 executing the action to select, via the real-time content selection process, the content item from the top ranking candidate content items.

The data processing system 102 can provide the selected content item to the client computing device 136 to cause the client computing device 136 to present the content item to the user of the computing device 136. The data processing system 102 can provide the content item to the local digital assistant 144 to cause the local digital assistant 144 executing on the client computing device 136 to play the content item via an audio output, such as via a voice output. The data processing system 102 can, in some cases, provide the content item to the application 142 to cause the application 142 to present the content item. For example, the application 142 can output the content item by playing the content item using audio output or visual output. The application 142 or local digital assistant 144 can present or output the content item during performance of the action invoked in the application, prior to execution of the action, or subsequent to execution of the action. In some cases, the computing device 136 can pause execution of the action in order to play or output the content item. In some cases, the computing device 136 can wait to play the content item until the action has completed executing in the application 142. In some cases, the computing device 136 can wait a predetermined amount of time upon completion of execution of the action to play the content item, such as 1 second, 2 seconds, 5 seconds, 10 seconds, 15 seconds, 30 seconds or other time interval.

Upon presenting the content item, the data processing system 102 can receive an indication of a level of interaction with the content item. The data processing system 102 can store the level of interaction as performance data in the content data 126 data structure. The data processing system 102, such as via the embedding extractor 112, can re-train the machine learning model with the indication of the level of interaction to update the bit vector corresponding to the action. For example, if the selected content did not perform well, then the embedding extractor 112 can update the bit vector for the action to remove the content item from the bit vector such that the content item may not be selected responsive to future invocation of the action in the application. In another example, the embedding extractor 112 can update the bit vector to lower the rank or score of the content item to reduce the likelihood that the content item is selected responsive to a future invocation of the action in the application. Thus, the data processing system 102 can improve the deep learning model 128 responsive to real-time performance feedback, and the embedding extractor 112 can update the bit vector based on the re-trained model.

Figure 2:
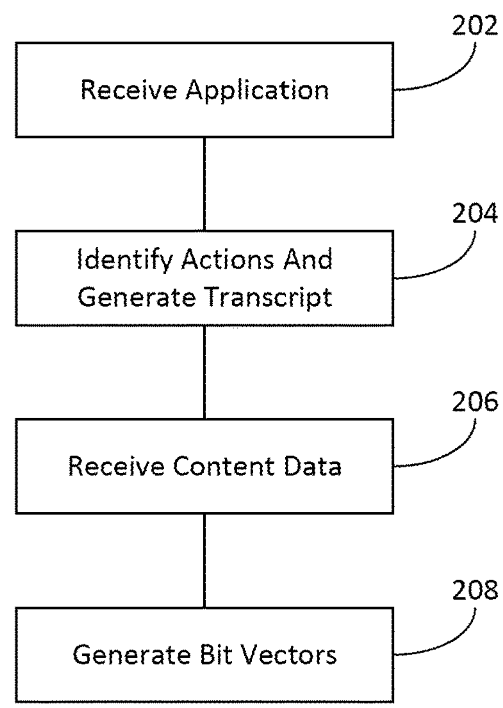
FIG. 2 is an illustration of an example method for generating a bit vector for content matching for third-party digital assistant actions, in accordance with implementations.

FIG. 2 is an illustration of an example method for generating a bit vector for content matching for third-party digital assistant actions, in accordance with implementations. The method 200 can be performed by one or more system or component depicted in FIG. 1, including, for example, a data processing system. The data processing system can receive an application at 202. The data processing system can receive the application from an application developer. The developer of the application can provide the application to the data processing system. The developer of the application can upload the application to the data processing system or otherwise transmit or provide the application to the data processing system. For example, the application can be stored as a binary file, executable file, application package file, or in another format that facilitates installing and executing the application on the data processing system or a client computing device.

At 204, the data processing system can identify actions in the application and generate a transcript. The data processing system can crawl the application to identify the action. The data processing system can identify the actions by installing and executing the application. The data processing system can simulate a conversation with the application to generate one or more dialogue flows in the application that can result in the invocation or execution of an action in the application. The action can be referred to as a voice-assistant compatible action because the action can be invoked via a voice-based conversation with a user of the application. The action can be invoked via an utterance from the user. The action can be identified or selected via a conversation facilitated by a digital assistant that executes on the data processing system or a client computing device, or both.

The data processing system can generate a transcript for the identified actions. The transcript can be generated for the particular application. The transcript can indicate the various actions that are identified in the application, as well as information associated with the dialog flow or conversation that resulted in invocation of the action. For example, the transcript can include information about the simulated utterances that resulted in invocation of the action. The transcript can include utterances by the simulated user as well as the application engaging with the simulated user.

At 206, the data processing system can receive content data. Content data can refer to supplementary content items. The data processing system can receive the content data from one or more supplemental content providers, such as advertisers. The data processing system can receive the content data from a data repository accessible to the data processing system that stores the content data. The content data can include content items, such as digital component objects, as well as performance data associated with historical or previous presentations of the content items.

At 208, the data processing system can generate bit vectors for the one or more actions indicated in the transcript. To do so, the data processing system can use a deep learning model trained on historical content performance data. The data processing system can input the transcript for the application and the content data into the deep learning model to generate an embedding or bit vector or bit array for each action that indicates a subset of content items as being candidate content items for presentation responsive to invocation of the action in the application. By generating a bit vector indicating a subset of the content items, the data processing system can improve the efficiency and accuracy of the real-time content selection process.

Figure 3:
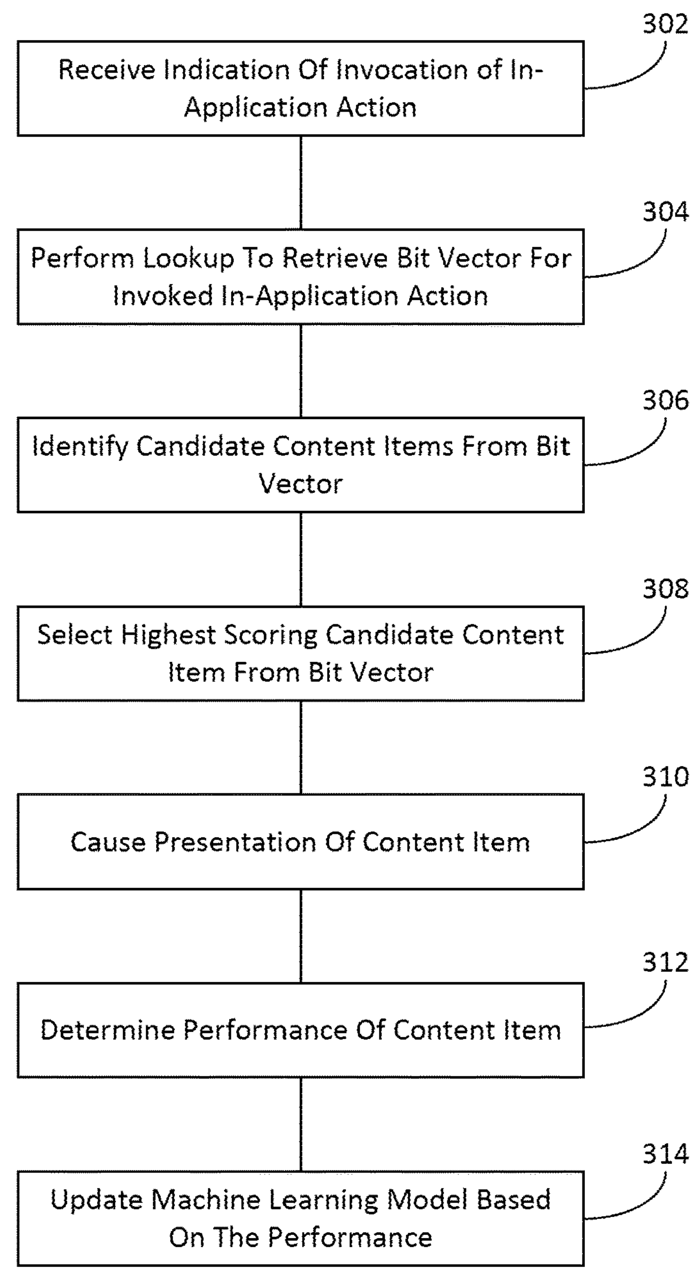
FIG. 3 is an illustration of an example method for selecting content using a bit vector in response to invocation of a third-party digital assistant action, in accordance with implementations.

FIG. 3 is an illustration of an example method for selecting content using a bit vector in response to invocation of a third-party digital assistant action, in accordance with implementations. The method 300 can be performed by one or more system or component depicted in FIG. 1, including, for example, a data processing system. At 302, the data processing system can receive an indication of invocation of an in-application action. The in-application action can refer to or include a voice assistant-compatible action. For example, the action can be triggered, invoked or launched responsive to voice input from a user of a client computing device. The action can be invoked via a local digital assistant executing on the client computing device. The action can be invoked or parsed by an NLP component that executes on the client computing device or the data processing system.

Responsive to invocation of the action, the client computing device can transmit an indication to the data processing system. The indication to the transmitted to the data processing system can include information about the application, the action, or signals associated with the computing device. For example, the information transmitted to the data processing system can include an identifier for the action or an identifier of the application. The signals can include, for example, a geographic location of the computing device, a type of the computing device, or information associated with a profile or electronic account linked to the computing device. In some cases, signals can include information about preferences associated with the computing device, such as preferences for types of content.

The client computing device can transmit the indication to the data processing system via a local digital assistant, the application, or other component executing on the client computing device. For example, the application can transmit the indication to the data processing system responsive to invocation of the action. The local digital assistant can detect invocation of the action, and package a transmission to the data processing system that includes the identifier of the action or application, along with other signals associated with the computing device.

At 304, the data processing system can perform a lookup in a data repository to identify a bit vector for the action in the application. The data processing system can perform the lookup using an identifier of the action and the application. At 306, the data processing system can identify candidate content items from a bit vector. The data processing system can use the information received from the client computing device to perform a lookup in a data repository to retrieve or access a bit vector configured for the action. The bit vector can include candidate content items associated with the action.

At 308, the data processing system can select the highest scoring candidate content item from the bit vector. The data processing system can use any scoring technique to determine scores for each of the content items. The data processing system can rank the content items using the scores to determine the highest ranking content item. The data processing system can determine the score for each content item based on or using the signals received from the computing device. For example, if a content item is associated with a geographic location that is the same as the geographic location of the client computing device, then the data processing system can score that content item higher than another content item that may not be associated with the geographic location of the client computing device. In another example, the client computing device can be configured to use the English language, and content items in French may be scored lower by the data processing system as compared to content items in English.

AT 310), the data processing system can transmit the selected content item to the client computing device to cause the client computing device to present the content item. The data processing system can include instructions as to how to present the content item. The data processing system can provide instructions with regard to when to present the content item, what output device to use to present the content item, or interactive features to allow for the content item. The data processing system can provide the content item to the component of the client computing device that transmitted the indication of the invocation of the action. For example, the data processing system can return the content item to the application or a local digital assistant executing on the client computing device.

At 312, the data processing system can determine a performance of the content item. The data processing system can determine the performance of the content item based on whether the user interacted with the content item or a type of interaction with the content item. Performance can be based on whether the user allowed the content item to play back fully, whether the user skipped playback of the content item, whether the user closed the content item, canceled the content item, fast forwarded the content item, or otherwise interacted with the content item. For example, if the content item is an audio clip and the computing device played the full duration of the audio clip, then the data processing system can determine that the content item performed well. If, however, the user skipped play back of the content item, then the data processing system can determine that the content item performed poorly.

At 314, the data processing system can update the machine learning model based on the performance of the content item. The data processing system can update the machine learning model or deep learning model used to generate the bit vector based on the performance of the content item. For example, if the content item performed poorly, then the data processing system can remove the content item from the bit vector. If the content item performed well, then the data processing system can keep the content item as a candidate content item in the bit vector, or increase a score or weight associated with the candidate content item.

Figure 4:
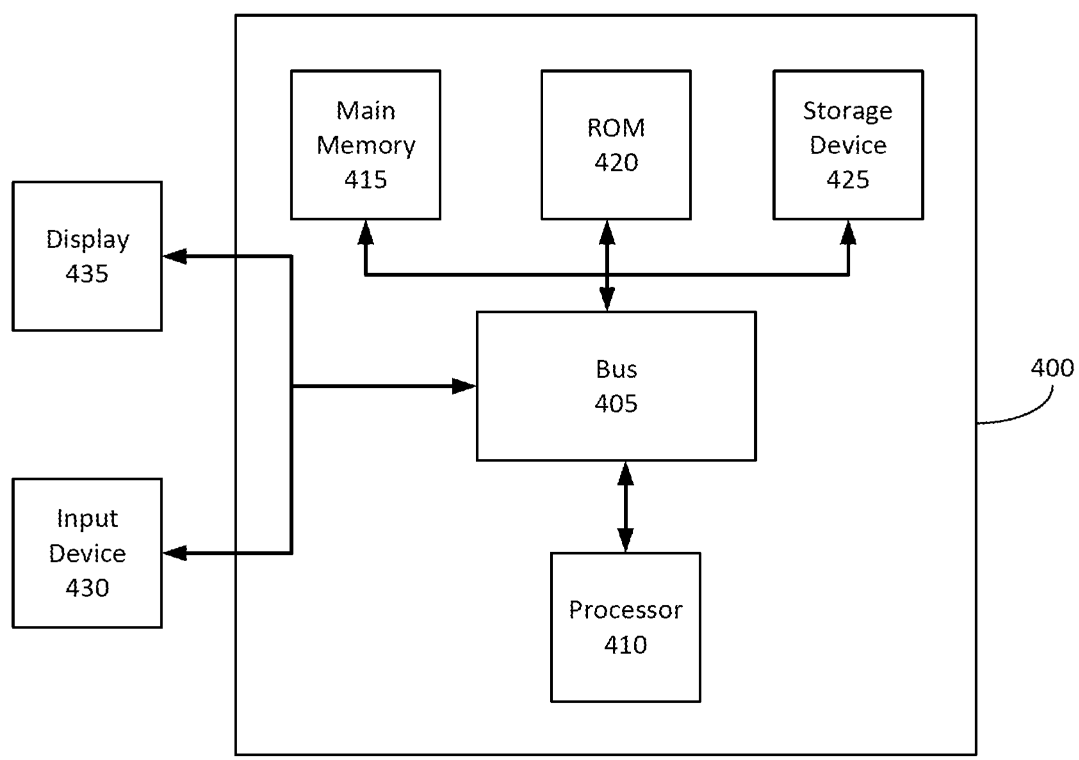
FIG. 4 is a block diagram illustrating an architecture for a computer system that can be employed to implement elements of the systems and methods described and illustrated herein, including, for example, the system depicted in FIG. 1, and the methods depicted in FIGS. 2 and 3.

FIG. 4 is a block diagram of an example computer system 400. The computer system or computing device 400 can include or be used to implement the system 100, or its components such as the data processing system 102, or client computing device 136. The data processing system 102 or client computing device 136 can include an intelligent personal assistant or voice-based digital assistant. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 120. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 120.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102 or the client computing device 136 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, action crawler 110, embedding extractor 112 or other components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks: and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 136 or the supplementary digital content provider device 132).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the natural language processor 106 and interface 104 can be a single component, app, or program, or a logic device having one or more processing circuits, or part of one or more servers of the data processing system 102.

Having now described some illustrative implementations, it is apparent that the foregoing is illustrative and not limiting, having been provided by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system, comprising:

a data processing system comprising memory and one or more processors to:

receive an application from an application developer that is configured with voice assistant-compatible actions;

identify a plurality of actions the application is configured to perform responsive to voice input;

identify a plurality of content items provided by a plurality of third-party computing devices;

generate, via a machine learning model and performance data for the plurality of content items, a plurality of bit vectors corresponding to the plurality of actions, the plurality of bit vectors indicating a plurality of candidate content items for each action of the plurality of actions; and select, responsive to a request for content for a computing device that executes an action of the application, a content item based on a bit vector of the plurality of bit vectors that corresponds to the action.

2. The system of claim 1, comprising:

the data processing system to crawl the application to identify the plurality of actions the application is configured to perform responsive to voice input.

3. The system of claim 1, comprising:

the data processing system to simulate one or more conversations with the application to identify the plurality of actions.

4. The system of claim 1, comprising:

the data processing system to crawl the application to generate a transcript comprising the plurality of actions the application is configured to perform pursuant to one or more dialogues, the transcript storing information about the plurality of actions and the one or more dialogues used to invoke the plurality of actions.

5. The system of claim 1, wherein the performance data for the plurality of content items indicates a type of interaction with each of the plurality of content items responsive to a prior presentation of each of the plurality of content items via one or more computing devices.

6. The system of claim 5, wherein the type of interaction comprises at least one of a skip, a fast forward, or a duration of presentation.

7. The system of claim 1, comprising the data processing system to:

receive an indication from the computing device of invocation of the action;

perform a lookup with the action in a data repository storing the plurality of bit vectors to retrieve the bit vector corresponding to the action;

identify, from the bit vector for the action, a plurality of top ranking candidate content items; and select the content item from the plurality of top ranking candidate content items identified from the bit vector for the action.

8. The system of claim 7, comprising the data processing system to:

use one or more signals associated with the computing device executing the action to select, via a real-time content selection process, the content item from the plurality of top ranking candidate content items.

9. The system of claim 1, comprising the data processing system to:

receive an indication of a level of interaction with the content item selected responsive to the action and presented via the computing device; and re-train the machine learning model with the indication of the level of interaction to update the bit vector corresponding to the action.

10. The system of claim 1, wherein each of the plurality of bit vectors stores a subset of the plurality of content items corresponding to highest ranking content items.

11. A method, comprising:

receiving, by a data processing system comprising memory and one or more processors, an application from an application developer that is configured with voice assistant-compatible actions;

identifying, by the data processing system, a plurality of actions the application is configured to perform responsive to voice input;

identifying, by the data processing system, a plurality of content items provided by a plurality of third-party of computing devices;

generating, by the data processing system via a machine learning model and performance data for the plurality of content items, a plurality of bit vectors corresponding to the plurality of actions, the plurality of bit vectors indicating a plurality of candidate content items for each action of the plurality of actions; and selecting, by the data processing system responsive to a request for content for a computing device that executes an action of the application, a content item based on a bit vector of the plurality of bit vectors that corresponds to the action.

12. The method of claim 11, comprising:

crawling, by the data processing system, the application to identify the plurality of actions the application is configured to perform responsive to voice input.

13. The method of claim 11, comprising:

simulating, by the data processing system, one or more conversations with the application to identify the plurality of actions.

14. The method of claim 11, comprising:

crawling, by the data processing system, the application to generate a transcript comprising the plurality of actions the application is configured to perform pursuant to one or more dialogues, the transcript storing information about the plurality of actions and the one or more dialogues used to invoke the plurality of actions.

15. The method of claim 11, wherein the performance data for the plurality of content items indicates a type of interaction with each of the plurality of content items responsive to a prior presentation of each of the plurality of content items via one or more computing devices.

16. The method of claim 15, wherein the type of interaction comprises at least one of a skip, a fast forward, or a duration of presentation.

17. The method of claim 11, comprising:

receiving, by the data processing system, an indication from the computing device of invocation of the action;

performing, by the data processing system, a lookup with the action in a data repository storing the plurality of bit vectors to retrieve the bit vector corresponding to the action;

identifying, by the data processing system from the bit vector for the action, a plurality of top ranking candidate content items; and selecting, by the data processing system, the content item from the plurality of top ranking candidate content items identified from the bit vector for the action.

18. The method of claim 17, comprising:

using, by the data processing system, one or more signals associated with the computing device executing the action to select, via a real-time content selection process, the content item from the plurality of top ranking candidate content items.

19. The method of claim 11, comprising:

receiving, by the data processing system, an indication of a level of interaction with the content item selected responsive to the action and presented via the computing device; and re-training, by the data processing system, the machine learning model with the indication of the level of interaction to update the bit vector corresponding to the action.

20. The method of claim 11, wherein each of the plurality of bit vectors stores a subset of the plurality of content items corresponding to highest ranking content items.

* * * * *